US009524596B2

(12) United States Patent
Kataoka

(10) Patent No.: US 9,524,596 B2
(45) Date of Patent: Dec. 20, 2016

(54) KEYLESS ENTRY CONTROL SYSTEM AND CONTROL METHOD FOR OUTBOARD MOTORS

(71) Applicant: SUZUKI MOTOR CORPORATION, Hamamatsu-shi, Shizuoka (JP)

(72) Inventor: Toshiya Kataoka, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 14/731,372

(22) Filed: Jun. 4, 2015

(65) Prior Publication Data

US 2015/0353178 A1 Dec. 10, 2015

(30) Foreign Application Priority Data

Jun. 6, 2014 (JP) ................................ 2014-117538

(51) Int. Cl.

| | |
|---|---|
| ***G05D 1/00*** | (2006.01) |
| ***G07C 9/00*** | (2006.01) |
| *B63H 21/21* | (2006.01) |
| *G07C 5/08* | (2006.01) |

(52) U.S. Cl.

CPC ....... *G07C 9/00142* (2013.01); *G07C 9/00111* (2013.01); *B63H 2021/216* (2013.01); *G07C 5/08* (2013.01)

(58) Field of Classification Search

CPC ..... B63H 21/21; B63H 2021/216; G07C 9/00; G07C 9/00111; G07C 9/00142

USPC ........................................ 701/2, 21; 440/1, 2

See application file for complete search history.

(56) References Cited

U.S. PATENT DOCUMENTS

| | | | | |
|---|---|---|---|---|
| 8,294,559 B2 | 10/2012 | Yoshizawa et al. | ..... | 340/426.36 |
| 2005/0118896 A1* | 6/2005 | Okuyama | ............. | B63H 21/22 440/2 |
| 2008/0020656 A1* | 1/2008 | Yamada | ................. | B63H 20/00 440/1 |
| 2009/0021361 A1 | 1/2009 | Yoshizawa et al. | .......... | 340/438 |
| 2010/0045487 A1* | 2/2010 | Bamba | ................ | B63H 21/213 340/984 |
| 2013/0045648 A1* | 2/2013 | Kinpara | ................ | B63H 20/00 440/6 |

FOREIGN PATENT DOCUMENTS

| | | |
|---|---|---|
| JP | 2008-37182 A | 2/2008 |

* cited by examiner

*Primary Examiner* — Thomas G Black
*Assistant Examiner* — Luke Huynh
(74) *Attorney, Agent, or Firm* — Stein IP, LLC

(57) ABSTRACT

There is provided a keyless entry control system for a plurality of outboard motors attached to a body of a ship. A plurality of engine control modules are provided in the plurality of outboard motors. A detector is connected to all of the plurality of engine control modules. In response to a detection result of the detector, use permission authentication on the plurality of engine control modules is performed.

7 Claims, 3 Drawing Sheets

KEYLESS ENTRY CONTROL SYSTEM AND CONTROL METHOD FOR OUTBOARD MOTORS

CROSS-REFERENCE TO RELATED APPLICATIONS

The disclosure of Japanese Patent Application No. 2014-117538 filed on Jun. 6, 2014, including specification, drawings and claims is incorporated herein by reference in its entirety.

TECHNICAL FIELD

The present invention relates to a keyless entry control system and control method for outboard motors, and particularly, to a keyless entry control system and control method for outboard motors which are attached to the body of a ship.

BACKGROUND

Vehicles such as motorcycles which are equipped with keyless entry systems enabling users to lock or unlock doors or to start engines by button operations without inserting ignition keys into key cylinders have come into wide use. In each keyless entry system, a door lock control system and an engine control system are controlled by electric waves of a transmitter incorporated in the body of an ignition key. For example, this ignition key equipped with the transmitter is called a smart key.

There has been proposed a vehicle which is equipped with a keyless entry system and has a control device which enables a user to easily make the vehicle usable without using a smart key in an emergency, for example, in a case where the smart key is lost or broken (see Patent Document 1 for instance). This control device includes a display unit which flashes on the occasion of inputting a password number for authentication to permit use of the vehicle, and a password number input unit for inputting the password number according to the number of flashing times of the display unit, thereby simplifying password number input work of the user.

Patent Document 1: Japanese Patent Application Publication No. 2008-037182A

Recently, ships using keyless entry systems as described above have been developed. However, in circumstances, ships are different from vehicles such as motorcycles which are integrated with engines, in that outboard motors including engines are configured so as to be attachable to and detachable from the bodies of ships. Also, in case of some kinds of ships, a plurality of outboard motors is attached to the body of a ship. These special circumstances are required to be considered to design keyless entry systems for ships.

SUMMARY

It is an object of the present invention to provide a keyless entry control system and control method for outboard motors which can make all outboard motors usable without requiring complicated operation in an emergency such as loss or failure of the smart key even in a case where a plurality of outboard motors is attached to the body of a ship.

According to an aspect of the embodiments of the present invention, there is provided a keyless entry control system for a plurality of outboard motors attached to a body of a ship, comprising: a plurality of engine control modules provided in the plurality of outboard motors; and a detector connected to all of the plurality of engine control modules, wherein, in response to a detection result of the detector, use permission authentication on the plurality of engine control modules is performed.

According to this configuration, the use permission authentication on the plurality of engine control modules is performed in response to a detection result of the detector connected to all of the plurality of engine control modules. Therefore, it is unnecessary to individually perform use permission authentication on each of the plurality of engine control modules. As a result, even in the case where the plurality of outboard motors is attached to the body of the ship, it becomes possible to make all outboard motors usable without requiring complicated operation in an emergency such as loss or failure of the smart key.

In the above described keyless entry control system for outboard motors, it is preferable that the detector includes a first detector configured to detect an instruction for performing a transition to a mode for inputting a password number for performing the use permission authentication on the plurality of engine control modules, and a second detector configured to detect an instruction for inputting the password number. According to this configuration, since a transition to the password number input mode is performed by the first detector, it is possible to surely receive the input of the password number in the corresponding input mode. As a result, it is possible to suppress occurrence of a situation such as misrecognition of the input password number, and it becomes possible to simplify password number input work.

For example, in the above described keyless entry control system for outboard motors, the first detector is comprised of an emergency stop switch for stopping the plurality of outboard motors in an emergency. According to this configuration, it is possible to perform a transition to the password number input mode using the emergency stop switch which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost.

Also, in the above described keyless entry control system for outboard motors, the second detector is comprised of an emergency stop switch for stopping the plurality of outboard motors in an emergency. According to this configuration, it is possible to receive the input of the password number, using the emergency stop switch which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost. Especially, in the case where the first detector is comprised of an emergency stop switch, it is possible to realize a transition to the password number input mode and the input of the password number input by the single emergency stop switch, and it becomes possible to make all outboard motors in an emergency by minimum change of specifications.

Further, in the above described keyless entry control system for outboard motors, the second detector may be comprised of a lever sensor configured to detect the position of a remote control lever for receiving an operation of a ship operator. Even in this configuration, it is possible to receive the input of the password number, using the lever sensor which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost.

Furthermore, in the above described keyless entry control system for outboard motors, the second detector may be comprised of a neutral sensor configured to detect whether a shift position according to the position of a remote control lever for receiving an operation of a ship operator is a neutral position. Even in this configuration, it is possible to receive the input of the password number, using the neutral sensor switch which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost.

Also, in the above described keyless entry control system for outboard motors, the second detector may be comprised of a throttle sensor configured to detect an opening degree of a throttle valve according to the position of a remote control lever for receiving an operation of a ship operator. Even in this configuration, it is possible to receive the input of the password number, using the throttle sensor which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost.

Further, in the above described keyless entry control system for outboard motors, the second detector may be comprised of an angle adjusting switch for adjusting the angles of the plurality of outboard motors to the body of the ship. Even in this configuration, it is possible to receive the input of the password number, using the angle adjusting switch which is a piece of existing equipment in the ship equipped with the plurality of outboard motors. Therefore, it is unnecessary to provide a special constituent element for performing use permission authentication on the plurality of engine control modules, and thus it becomes possible to suppress the system manufacturing cost.

It is preferable that the above described keyless entry control system for outboard motors further includes a keyless controller connected to all of the plurality of engine control modules, and a password number for performing the use permission authentication on the plurality of engine control modules may be registered at once through the keyless controller. According to this configuration, since the password number for the plurality of engine control modules is registered at once through the keyless controller, even in the case where the plurality of engine control modules are provided on the ship body, it becomes possible to simplify password number registration work.

According to another aspect of the embodiments of the present invention, there is provided a keyless entry control method for a plurality of outboard motors which are attached to a body of a ship, and are provided with a plurality of engine control modules and a detector which is connected to all of the plurality of engine control modules. The method includes performing a transition to a mode for inputting a password number for performing use permission authentication on the plurality of engine control modules, and performing the use permission authentication on the plurality of engine control modules using the password number input through the detector in the password number input mode.

According to this method, if the password number is input through the detector connected to all of the plurality of engine control modules in the password number input mode, the use permission authentication on the plurality of engine control modules is performed using the input password number. Therefore, it is unnecessary to individually perform use permission authentication on each of the plurality of engine control modules. As a result, even in the case where the plurality of outboard motors is attached to the body of the ship, it becomes possible to make all outboard motors usable in an emergency, without requiring complicated control. Also, since it is possible to surely receive the input of the password number in the password number input mode, it is possible to suppress occurrence of a situation such as misrecognition of the input password number, and it becomes possible to simplify password number input work.

According to the keyless entry control system and control method for outboard motors, even in a case where a plurality of outboard motors is attached to the body of a ship, it becomes possible to make all outboard motors usable without requiring complicated operation in an emergency such as loss or failure of the smart key.

DETAILED DESCRIPTION OF THE EMBODIMENTS

Hereinafter, an embodiment will be described in detail with reference to the accompanying drawings. Hereinafter, a case where a ship to which the keyless entry control system for outboard motors (hereinafter also referred to as a keyless entry control system) according to the present embodiment is applied is equipped with three outboard motors will be described. However, the number of outboard motors which is mounted on a ship to which the keyless entry control system according to the present embodiment can be applied is not limited to three, and can be appropriately changed. For example, the keyless entry control system according to the present embodiment can be applied to ships equipped with two outboard motors or four or more outboard motors.

Figure 1:
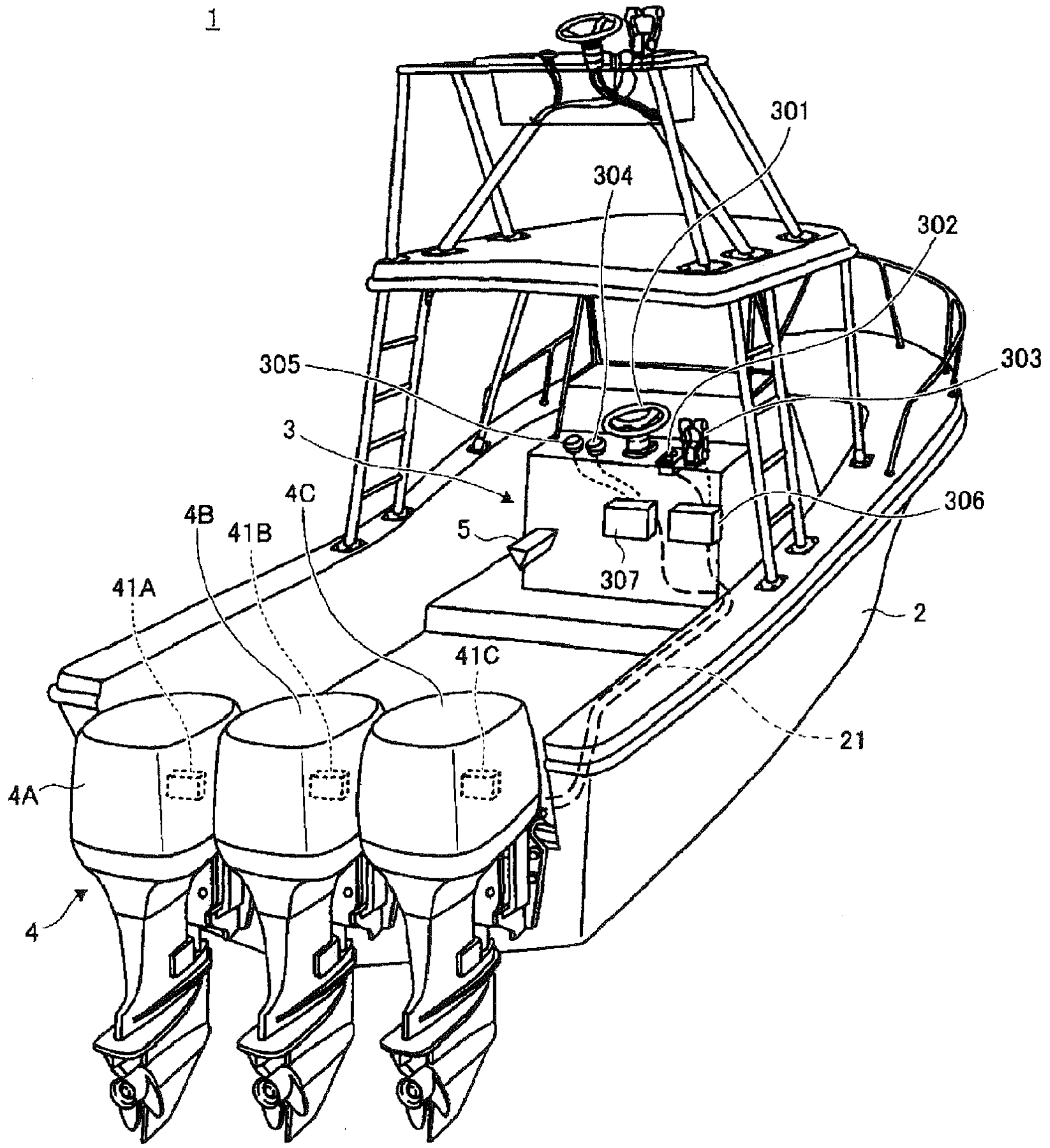
FIG. 1 is a perspective view illustrating an overall configuration of a ship to which a keyless entry control system for outboard motors according to an embodiment is applied.

FIG. 1 is a perspective view illustrating the overall configuration of a ship to which the keyless entry control system according to the present embodiment is applied. FIG. 1 shows a ship equipped with an electronic control throttle system. The electronic control throttle system acquires the operation state of a remote control lever which receives an operation of a ship operator by a sensor, and performs an electric process, thereby performing control to open or close a throttle valve. In addition, the electronic control throttle system acquires the operation state of the remote control lever by the sensor, and performs an electric process, thereby switching a shift position to forward, neutral, or reverse position.

Also, ships to which the keyless entry control system according to the present embodiment can be applied are not limited to ships equipped with electronic control throttle systems. For example, the keyless entry control system according to the present embodiment may be applied to a ship equipped with a mechanical control throttle system in which a remote control lever and a throttle valve are mechanically connected by a remote control cable. The mechanical control throttle system performs control to directly open or close the throttle valve through the remote control cable, in response to the operation state of the remote control lever. Also, the mechanical control throttle system switches the shift position to forward, neutral, or reverse position through the remote control cable.

As shown in FIG. 1, a ship 1 is configured so as to include a ship body 2 which is made of aluminum, fiber reinforced plastics (FRP), or the like, a ship operating unit 3 which is installed at a position on the bow side slightly from the center of the ship body 2, and three outboard motors 4 (4A to 4C) which are attached to the stern of the ship body 2. The ship operating unit 3 is a part which receives operation instructions issued with respect to the ship by a ship operator. Each outboard motor 4 includes an engine and a propeller, and generates a propulsive force for the ship 1 in response to an operation of the ship operator.

At the center of the ship operating unit 3, a steering wheel 301 is provided so as to be turned by the ship operator to steer the ship. On the right side of the steering wheel 301 (the right side of the movement direction of the ship 1), an ignition switch 302 and a remote control lever (hereinafter, referred to as a "remote lever") 303 are installed. The ignition switch 302 is comprised of, for example, a push switch, and receives an operation of the ship operator for starting the outboard motors 4. The remote lever 303 receives an operation of the ship operator for moving the ship 1 forward or backward.

Meanwhile, on the left side of the steering wheel 301 (the left side of the movement direction of the ship 1), an emergency power supply key switch 304 and an emergency stop switch 305 are installed. The emergency power supply key switch 304 is a switch for instructing supply of electric power to engine control modules (hereinafter, referred to as "ECMs") 41 of the outboard motors 4 (to be described below) in an emergency, for example, in a case where an ignition key is lost. The emergency stop switch 305 is a switch for instructing stop of driving of the outboard motors 4 in an emergency. Also, in FIG. 1, both of the emergency power supply key switch 304 and the emergency stop switch 305 are shown as being capable of being pushed by the ship operator. However, they are not limited thereto. Also, the ignition switch 302 and the emergency power supply key switch 304 may be configured as one body.

Also, in the ship operating unit 3, a boat control module (hereinafter, referred to as a "BCM") 306 and a keyless controller 307 are installed. The BCM 306 controls the ECMs 41 of the outboard motors 4 (to be described below) in response to an operation on the remote lever 303. The keyless controller 307 is a part for performing main control of the keyless entry control system. For example, the keyless controller 307 performs an authentication process between the keyless controller and a portable device 5 which the ship operator carries, and an authentication process between the keyless controller and the ECMs 41 of the outboard motors 4 (to be described below). Also, the keyless controller 307 allows electric power to be supplied to the ECMs 41, in response to the results of those authentication processes.

The three outboard motors 4A to 4C include the ECMs 41 (41A to 41C) for controlling engines included in the outboard motors, respectively. The ECMs 41 (41A to 41C) control the internal engines of the outboard motors 4A to 4C, respectively, for example, in response to signals from the BCM 306 or the keyless controller 307 connected to the ECMs through a controller area network (CAN) 21 provided in the ship body 2.

The portable device 5 constitutes a so-called smart key. While being on the ship 1, the ship operator carries the portable device 5, and thus can perform starting of the outboard motors 4 and the like without using the mechanical keys. The portable device 5 is equipped with a transmitter. This transmitter transmits an electric wave to be used in an authentication process with the keyless controller 307. Also, the portable device 5 may be configured so as to include the ignition key as a part.

Figure 2:
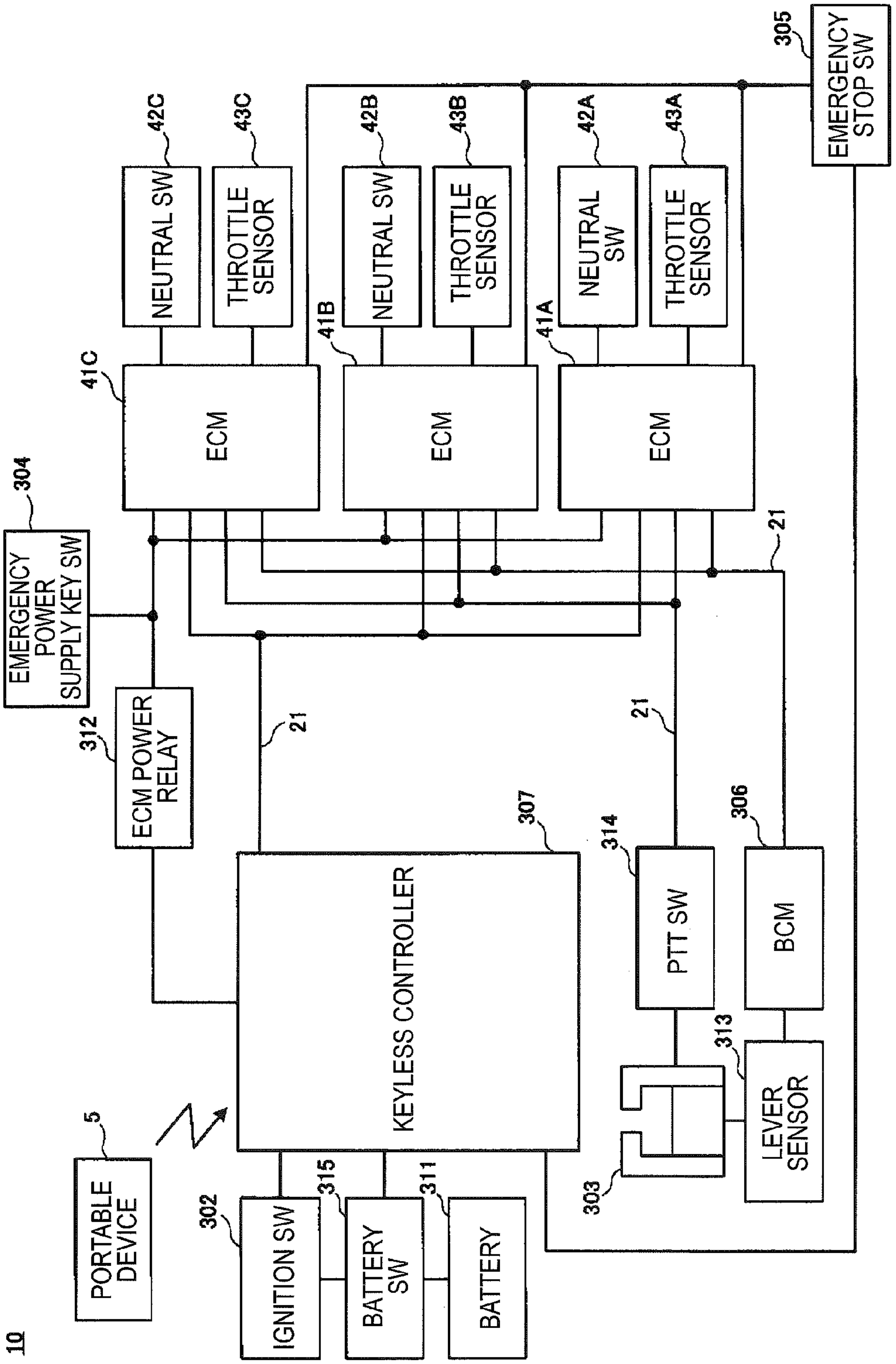
FIG. 2 is a view for explaining a configuration of the keyless entry control system for outboard motors according to the embodiment.

Hereinafter, a configuration example of the keyless entry control system according to the present embodiment will be described with reference to FIG. 2. FIG. 2 is a view for explaining the configuration of the keyless entry control system according to the present embodiment. Also, in FIG. 2, for convenience of explanation, the outboard motors 4 and some constituent elements such as the engines included in the outboard motors 4 are omitted. Also, in FIG. 2, the common constituent elements to FIG. 1 are denoted by the same reference symbols, and repetitive descriptions thereof will be appropriately omitted.

As shown in FIG. 2, a keyless entry control system 10 is configured so as to include the keyless controller 307 and the BCM 306 which are connected to the ECMs 41A to 41C through the CAN 21, and the portable device 5 capable of wireless communication with the keyless controller 307. The keyless controller 307 and the BCM 306 are connected to all ECMs 41A to 41C, and can perform communication with or control on each of the ECMs 41A to 41C.

The keyless controller 307 is connected to a battery 311 through the ignition switch (SW) 302 and a battery switch (SW) 315. If the ship operator turns on the battery SW 315, electric power is supplied from the battery 311 to the keyless controller 307.

Between the keyless controller 307 and the ECMs 41A to 41C, an ECM power relay 312 is connected. The ECM power relay 312 relays electric power supplied to the keyless controller 307, to the ECMs 41A to 41C. In response to an instruction from the keyless controller 307, the ECM power relay 312 receives electric power supplied from a battery (not shown), thereby being switched from an open state to a connection state.

Also, between the ECM power relay 312 and the ECMs 41A to 41C, the above described emergency power supply key switch (SW) 304 is connected. Even in a situation where electric power is not being supplied through the ECM power relay 312, the emergency power supply key SW 304 supplies electric power from a battery (not shown) to the ECMs 41A to 41C if being pushed by the ship operator.

Further, the keyless controller 307 is connected to the emergency stop switch (SW) 305. Also, the emergency stop SW 305 is connected to all of the ECMs 41A to 41C. If the emergency stop SW 305 is operated, the ECMs 41A to 41C stop the engines.

The remote lever 303 is connected to a lever sensor 313. The lever sensor 313 detects the position of the remote lever 303. A signal detected by the lever sensor 313 (a lever sensor signal) is output to the BCM 306. This lever sensor signal is used for control of the BCM 306 on the ECMs 41A to 41C.

Also, in the remote lever 303, a power trim tilt switch (PTT SW) 314 is provided. The PTT SW 314 receives a pushing operation of the ship operator for adjusting the angles of the plurality of outboard motors 4 to the ship body 2. A signal according to the operation on the PTT SW 314 (a PTT SW signal) is output to the ECMs 41A to 41C, and is used in the ECMs 41A to 41C to adjust the angles of the outboard motors 4.

The ECM 41A is connected to a neutral switch (SW) 42A and a throttle sensor 43A. The neutral SW 42A detects whether the shift position according to the position of the remote lever 303 is the neutral position. The throttle sensor 43A detects the opening degree of a throttle valve according to the position of the remote lever 303. Similarly, the ECM 41B is connected to a neutral SW 42B and a throttle sensor 43B, and the ECM 41C is connected to a neutral SW 42C and a throttle sensor 43C.

Subsequently, operations of the keyless entry control system 10 having the above described configuration will be described. Here, a normal operation in which all constituent elements normally operate, and an emergency operation during occurrence of a breakdown or the like in a specific constituent element will be separated described. As a situation which causes the emergency operation to be performed, for example, situations where the keyless controller 307 is broken, or the portable device 5 is lost can be assumed. Hereinafter, a situation where the keyless controller 307 is broken will be described.

In the normal operation, if the ship operator turns on the ignition SW 302 with the portable device 5 carried, the keyless entry control system 10 is driven. If the keyless entry control system 10 is driven, first, the keyless controller 307 performs an authentication process with the portable device 5 (a first authentication process). In this first authentication process, for example, authentication numbers registered in advance in the portable device 5 and the keyless controller 307 are collated.

In a case where the authentication result of the first authentication process is "OK", the keyless controller 307 switches the ECM power relay 312 to the connection state, thereby supplying electric power to the ECMs 41A to 41C. Next, the keyless controller 307 performs an authentication process with the ECMs 41A to 41C (a second authentication process). In this second authentication process, similarly in the first authentication process, authentication numbers registered in advance in the keyless controller 307 and the ECMs 41A to 41C are collated.

In a case where the authentication result of the second authentication process is "OK", the ECMs 41A to 41C become able to control the engines included in the outboard motors 4A to 4C. More specifically, the ECMs 41A to 41C controls start or stop of the engines, fuel injection of fuel injectors, ignition of an ignition plugs, or shifts, in response to control signals from the BCM 306 (more specifically, control signals according to the operation state on the remote lever 303).

Meanwhile, in a case where the keyless controller 307 is broken, even if the ship operator is carrying the portable device 5, the ship operator cannot drive the keyless entry control system 10. For this reason, in the keyless entry control system 10, the emergency power supply key SW 304 and the emergency stop SW 305 are used to support the emergency operation to make the ECMs 41A to 41C usable.

In the emergency operation, if a password number registered in advance in the ECMs 41A to 41C is input to the ship 1 through an existing detector, authentication for permitting use of the ECMs 41A to 41C (use permission authentication) is performed. In the present embodiment, the emergency stop SW 305 for detecting an emergency stop operation of the ship operator, the lever sensor 313 for detecting the position of the remote lever 303, and the PTT SW 314 for detecting an operation for adjusting the angles of the outboard motors 4 constitute the detector for inputting the password number.

Password number registration in the ECMs 41A to 41C can be performed at once, for example, through the keyless controller 307. In this case, a common password number is registered in the ECMs 41A to 41C. By performs a password number in the ECMs 41A to 41C through the keyless controller 307 at once as described above, it is possible to simplify password number registration work even in the case where the ship 1 has the plurality of ECMs 41A to 41C.

In order to perform password number registration in the keyless controller 307, the ship operator can use the emergency stop SW 305. The ship operator can adjust intervals of ON/OFF operations on the emergency stop SW 305, thereby registering the password number. For example, in a case where the password number is a 4-digit number, the ship operator can input the password number by repeating work of performing a number of ON operations according to the number of a digit at time intervals shorter than a predetermined time and performing a transition to another digit at a time interval longer than the predetermined time. Alternatively, password number registration in the keyless controller 307 may be performed during manufacturing of the keyless controller 307.

Figure 3:
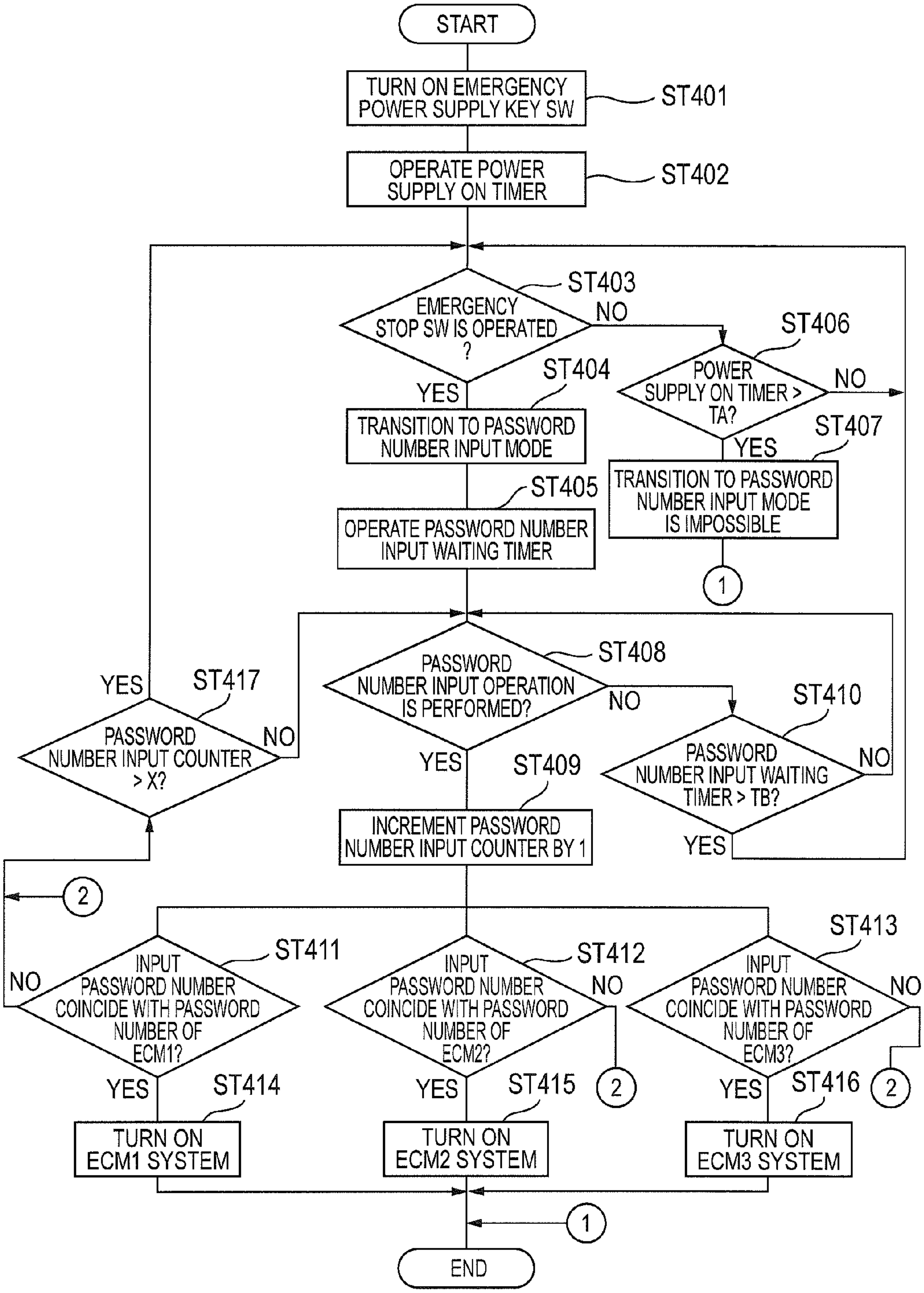
FIG. 3 is a flow chart for explaining an emergency operation which is performed by the keyless entry control system for outboard motors according to the embodiment.

The emergency operation is performed in a state where the ECMs 41A to 41C have the password number registered as described above. Hereinafter, the emergency operation which is performed by the keyless entry control system 10 according to the present embodiment will be described with reference to FIG. 3. FIG. 3 is a flow chart for explaining the emergency operation which is performed by the keyless entry control system 10 according to the present embodiment. Also, in FIG. 3, for convenience of explanation, the ECM 41A, the ECM 41B, and the ECM 41C are expressed as "ECM1", "ECM2", and "ECM3", respectively.

In the emergency operation, first, in step 401, the ship operator turns on the emergency power supply key SW 304. As a result, electric power is supplied from the battery connected to the emergency power supply key SW 304 to the ECMs 41A to 41C. Also, in response to the transition of the emergency power supply key SW 304 to the ON state, in step 402, a power supply ON timer (not shown) is operated.

Next, it is determined whether an operation of the ship operator for a transition to a mode for inputting the password number has been received. More specifically, in step 403, it is determined whether a specific operation using the emergency stop SW 305 has been received. That is, the emergency stop SW 305 serves as a detector (a first detector) which detects an instruction for a transition to the mode for inputting the password number for performing use permission authentication on the plurality of ECMs 41A to 41C.

Here, as the specific operation using the emergency stop SW 305, an operation of repeating a predetermined number of ON/OFF operations on the emergency stop SW 305 within a predetermined time can be assumed. For example, an operation of repeating five ON/OFF operations within 5 seconds can be assumed. However, the specific operation using the emergency stop SW 305 is not limited thereto, and can be appropriately changed.

If the specific operation using the emergency stop SW 305 is received ("Yes" in step 403), in step 404, the mode of the keyless entry control system 10 transitions to the mode for inputting the password number (password number input mode). Then, in response to the transition to the password number input mode, in step 405, a password number input waiting timer (not shown) is operated.

Meanwhile, in a case where the specific operation using the emergency stop SW 305 is not received ("No" in step 403), in step 406, it is determined whether the count value of the power supply ON timer exceeds a predetermined time TA. This determination is performed after the emergency power supply key SW 304 is turned on, in order to prevent a state where a password number input operation of the ship operator is not performed from continuing more than the predetermined time.

Here, in a case where the count value of the power supply ON timer does not exceed the predetermined time TA ("No" in step 406), the process returns to step 403, and the determining process of step 403 is repeated. Meanwhile, in a case where the count value of the power supply ON timer exceeds the predetermined time TA ("Yes" in step 406), it is determined in step 407 that a transition to the password number input mode is impossible, and the process of the emergency operation finishes.

After the password number input waiting timer is operated in step 405, in step 408, it is determined whether a password number input operation has been performed. As the password number input operation, for example, specific operations using the emergency stop SW 305, the lever sensor 313, and the PTT SW 314 can be assumed. That is, the emergency stop SW 305, the lever sensor 313, and the PTT SW 314 serve as a detector (a second detector) which detects an instruction for inputting the password number. Also, details of these password number input operations will be described below.

In a case where a password number input operation has been performed ("Yes" in step 408), in step 409, the count value of a password number input counter (not shown) is incremented. This password number input counter is for counting the number of times of password number input of the ship operator. The password number input counter serves to prevent password number input work of the ship operator from being performed more than a predetermined number of times.

Meanwhile, in a case where a password number input operation is not performed ("No" in step 408), in step 410, it is determined whether the count value of the password number input waiting timer exceeds a predetermined time TB. This determination is performed after the transition to the password number input mode, in order to prevent a state where any password number input operation of the ship operator is not performed from continuing more than the predetermined time.

Here, in a case where the count value of the password number input waiting timer does not exceed the predetermined time TB ("No" in step 410), the process returns to step 408, and the determining process of step 408 is repeated. Meanwhile, in a case where the count value of the password number input waiting timer exceeds the predetermined time TB ("Yes" in step 410), the process returns to step 403, and the processes of step 403 and the subsequent steps are performed again.

After the count value of the password number input counter is incremented in step 409, in steps 410 to 413, it is determined whether the input password number coincides with the password number of the ECMs 41A to 41C (ECM1 to ECM3). In a case where the input password number coincides with the password number of a corresponding ECM ("Yes" in steps 411 to 413), in steps 414 to 416, engine control systems corresponding respectively to the ECMs 41A to 41C (ECM1 to ECM3) are turned on. If the engine control systems are turned on, the ECMs 41A to 41C (ECM1 to ECM3) become able to perform fuel injection control and ignition control.

Meanwhile, in a case where the input password number does not coincide with the password number of the ECMs 41A to 41C ("No" in steps 411 to 413), in step 417, it is determined whether the count value of the password number input counter exceeds a predetermined number of times X. This determination is performed in order to prevent a situation where the password number is unlimitedly input by the ship operator.

In a case where the count value of the password number input counter does not exceed the predetermined number of times X ("No" in step 417), the process returns to step 408, and the processes of step 408 and the subsequent steps are performed again. Meanwhile, in a case where the count value of the password number input counter exceeds the predetermined number of times X ("Yes" in step 417), the process returns to step 403, and the processes of step 403 and the subsequent steps are performed again.

In this series of operations, if the engine control systems corresponding to the ECMs 41A to 41C (ECM1 to ECM3) are turned on in steps 414 to 416, the series of operations in the emergency operation finishes. In this way, it is possible to make all outboard motors 4A to 4C (the ECMs 41A to 41C) usable even in an emergency such as a case where the keyless controller 307 is broken or a case where the portable device 5 is lost.

Here, specific examples of the password number input operation of step 408 will be described. As the specific operation using the emergency stop SW 305, the same operation as the operation during the password number registration in the keyless controller 307 described above can be used. For example, in a case where the password number is a 4-digit number, the ship operator can input the password number by repeating work of performing a number of ON operations according to the number of a digit at time intervals shorter than a predetermined time and performing a transition to another digit at a time interval longer than the predetermined time.

Alternatively, it is possible to provide a buzzer which intermittently rings in conjunction with an ON operation on the emergency stop SW 305, or a light emitting element which intermittently flashes in conjunction with an ON operation on the emergency stop SW 305, and input the password number using the number of ringing times or the number of flashing times. For example, in a case where the password number is a 4-digit number, the emergency stop SW 305 is turned on, and if the light emitting element flashes a number of times corresponding to each digit, the emergency stop SW 305 is turned off. In order to input the number of another digit, at a predetermined time interval, the emergency stop SW 305 is turned on. In a case of inputting the password number using a buzzer or a light emitting element as described above, it is possible to reduce the number of operations on the emergency stop SW 305, and it is possible to simplify password number input work.

Also, in a case where a threshold for the position of the remote lever 303 is set in advance, and a case where the position of the lever sensor 313 exceeds the threshold is virtually defined as an ON state, and a case where the position of the lever sensor 313 does not exceed the threshold is virtually defined as an OFF state, a specific operation using these ON/OFF states can be assumed as the specific operation using the lever sensor 313. Also, as this specific operation using the ON/OFF states, the password number input operation using the emergency stop SW 305 described above can be used. Also, with respect to setting of the remote lever 303, for example, it can be considered to set the neutral position as the threshold, and define the forward position and the reverse position as the ON state and the OFF state, respectively.

Further, as the specific operation using the PTT SW 314, a specific operation using up operations and down operations on the PTT SW 314 can be assumed. For example, in a case where the password number is a 4-digit number, the ship operator can input the password number by repeating work of performing up operations according to the number of a digit at time intervals shorter than a predetermined time and performing a down operation, thereby performing a transition to another digit.

As described above, in the keyless entry control system 10 according to the present embodiment, in response to the detection result of the detector (for example, the emergency stop SW 305) connected to all of the ECMs 41A to 41C, use permission authentication on the ECMs 41A to 41C is performed. Therefore, it is unnecessary to individually perform use permission authentication with respect to each of the ECMs 41A to 41C. As a result, even in the case where the plurality of outboard motors 4 is attached to the ship body 2, it becomes possible to make all outboard motors 4 usable in an emergency, without requiring complicated control.

Especially, in the keyless entry control system 10 according to the present embodiment, after the transition to the password number input mode for performing use permission authentication on the plurality of ECMs 41A to 41C, use permission authentication on the ECMs 41A to 41C is performed using the password number. Therefore, it is possible to surely receive the input of the password number in the password number input mode. As a result, it is possible to suppress occurrence of a situation such as misrecognition of the input password number, and it becomes possible to simplify password number input work.

Here, the instruction for performing a transition to the password number input mode is received from the emergency stop SW 305 which is a piece of existing equipment in the ship 1. Also, after the transition to the password number input mode, the input of the password number is received from the emergency stop SW 305, the lever sensor 313, or the PTT SW 314 which is a piece of existing equipment in the ship 1. Therefore, it is unnecessary to provide a special constituent element for performing use permission authentication on the plurality of ECMs 41A to 41C, and thus it becomes possible to suppress the system manufacturing cost.

Especially, in a case of receiving both of the instruction for performing a transition to the password number input mode and the password number input by the emergency stop SW 305, it becomes unnecessary to change the specifications of other constituent elements. Therefore, it becomes possible to make all outboard motors 4A to 4C usable in an emergency by minimum change of the specifications.

Also, in the above described embodiment, the password number input operation in a case where the keyless entry control system 10 is applied to the ship 1 equipped with the electronic control throttle system has been described. In contrast to this, in a case where a mechanical control throttle system is mounted on the ship 1, as the password number input operation, for example, specific operations using the neutral SWs 42, the throttle sensors 43, and the PTT SW 314 can be assumed.

Here, the operation states of the neutral SWs 42 and the throttle sensors 43 are switched in response to an operation on the remote lever 303. In the ship 1 equipped with the mechanical control throttle system, it is possible to input the password number using the characteristics of the neutral SWs 42 and the throttle sensors 43 described above. A specific operation using the PTT SW 314 is the same as the operation in the ship 1 equipped with the electronic control throttle system, and thus will not be described.

The ON/OFF state of each neutral SW 42 is switched in response to the position of the remote lever 303. More specifically, in a case where the remote lever 303 is disposed at the forward position or the reverse position, each neutral SW 42 is turned off, and in a case where the remote lever 303 is disposed at the neutral position, each neutral SW 42 is turned on. As a specific operation using the neutral SWs 42, a specific operation using the ON/OFF states of the neutral SWs 42 can be assumed. Also, as this specific operation using the ON/OFF states, the password number input operation using the emergency stop SW 305 described above can be used.

Each throttle sensor 43 detects the opening/closing of a corresponding throttle valve as a throttle sensor value, in response to the position of the remote lever 303. In a case where a threshold for the throttle sensor value is set in advance, and a case where the throttle sensor value exceeds the threshold is virtually defined as an ON state, and a case where the throttle sensor value does not exceed the threshold is virtually defined as an OFF state, a specific operation using these ON/OFF states can be assumed as a specific operation using the throttle sensors 43. Also, as this specific operation using the ON/OFF states, the password number input operation using the emergency stop SW 305 described above can be used.

Even in this case where the ship 1 is equipped with the mechanical control throttle system, after the transition to the password number input mode, the input of the password number is received from the neutral SWs 42, the throttle sensors 43, or the PTT SW 314 each of which is a piece of existing equipment in the ship 1. Therefore, it is unnecessary to provide a special constituent element for performing use permission authentication on the plurality of ECMs 41A to 41C, and thus it becomes possible to suppress the system manufacturing cost.

Also, the present invention is not limited to the embodiment mentioned above and can be modified and implemented in various forms. With respect to the contents of the processes and determinations of the embodiment shown in the accompanying drawings, the present invention is not limited thereto and can be appropriately modified as long as the modifications exhibit the effects of the present invention. In addition, the invention can be appropriately modified and implemented without departing from the scope of the object of the invention.

For example, in the embodiment, a case of performing a transition to the password number input mode by the specific operation using the emergency stop SW 305 has been described. However, a constituent element for performing a transition to the password number input mode is not limited to the emergency stop SW 305, and can be appropriately modified. On the premise that an arbitrary constituent element is an existing constituent element in the ship 1, it is possible to perform a transition to the password number input mode by a specific operation using the arbitrary constituent element.

Also, in the embodiment, a case of using the emergency stop SW 305, the lever sensor 313, and the PTT SW 314 (the electronic control throttle system), or the neutral SWs 42, the throttle sensors 43, and the PTT SW 314 (the mechanical control throttle system) as a constituent element for inputting the password number has been described. However, the constituent element for inputting the password number is not limited thereto, and can be appropriately modified. On the premise that an arbitrary constituent element is an existing constituent element in the ship 1, it is possible to perform a transition to the password number input mode by a specific operation using the arbitrary constituent element.

As described above, the present invention has an effect that it is possible to make all outboard motors usable without requiring complicated control in an emergency even in a case where a plurality of outboard motors is attached to the body of a ship, and is useful, for example, in a ship equipped with a keyless entry control system.

What is claimed is:

1. A keyless entry control system for a plurality of outboard motors attached to a body of a ship, the keyless entry control system comprising:

a portable device;

a keyless controller provided in the body of the ship;

a plurality of engine control modules provided in the plurality of outboard motors, respectively; and a detector connected to all of the plurality of engine control modules without interposing the keyless controller therebetween, wherein authentication numbers are registered in advance in the portable device, the keyless controller and the plurality of engine control modules, wherein password numbers are registered in advance in the plurality of engine control modules, wherein the detector includes a first detector configured to detect an instruction for performing a transition to a mode for inputting a password number for performing use permission authentication on the plurality of engine control modules, and a second detector configured to detect an instruction for inputting the password number, wherein the plurality of engine control modules permit driving of the outboard motors based on collation results for the authentication numbers in a first authentication process which is performed between the portable device and the keyless controller and a second authentication process which is performed between the keyless controller and the engine control modules, and permit driving of the outboard motors based on collation results of use permission authentication using the password number input through the detector and the passwords registered in the plurality of engine control modules.

2. The keyless entry control system according to claim 1, wherein the second detector comprises an angle adjusting switch for adjusting angles of the plurality of outboard motors with respect to the body of the ship.

3. The keyless entry control system according to claim 1, wherein the first detector comprises an emergency stop switch for stopping the plurality of outboard motors in an emergency.

4. The keyless entry control system according to claim 1, wherein the second detector comprises an emergency stop switch for stopping the plurality of outboard motors in an emergency.

5. The keyless entry control system according to claim 1, wherein the second detector comprises a lever sensor configured to detect a position of a remote control lever for receiving an operation of a ship operator.

6. The keyless entry control system according to claim 1, wherein the second detector comprises a neutral sensor configured to detect whether a shift position according to a position of a remote control lever for receiving an operation of a ship operator is a neutral position.

7. The keyless entry control system according to claim 1, wherein the second detector comprises a throttle sensor configured to detect an opening degree of a throttle valve according to a position of a remote control lever for receiving an operation of a ship operator.

* * * * *